INVENTOR.
ARTHUR HAMBURGEN
BY John A. Harvey
ATTORNEY

July 25, 1967 A. HAMBURGEN 3,333,243

DETECTION AND CORRECTION OF TRANSPOSITION ERRORS

Filed Sept. 16, 1963 6 Sheets-Sheet 5

United States Patent Office 3,333,243
Patented July 25, 1967

3,333,243
DETECTION AND CORRECTION OF TRANSPOSITION ERRORS

Arthur Hamburgen, Endicott, N.Y., assignor to International Business Machines Corporation, New York, N.Y., a corporation of New York Filed Sept. 16, 1963, Ser. No. 309,126
10 Claims. (Cl. 340—146.1)

ABSTRACT OF THE DISCLOSURE

A system for enabling detection of character transposition errors in a multicharacter data word, wherein each alphanumeric and symbol character is represented in binary-coded form, utilizes both a word storage register for storing the individual characters of the data word in binary-coded form and a shift register into which the binary-coded individual characters of the word are placed from the storage register. Two lowest order end character columns of the shift register are rolled to enable a comparison unit to compare corresponding valued code bits of the characters placed in these columns, the comparison proceeding in order from highest to lowest binary-bit value. The compare unit generates and stores in an input position of a check-character shift register a high-low code bit indicating whether these compared characters have equal numeric-code value or which has higher numeric-code value. The shift and check-character registers are respectively shifted by one character and bit position after each comparison operation to generate and store in the check-character register a high-low comparison code bit. After plural such shift and compare operations, there is created and stored in the check-character register a check character indicating consecutive changes to higher or lower values of each adjacent pair of characters stored in the word storage register, and the check character is then preferably stored with the data word in the word storage register from which the word and check character may be transferred together to a further storage device or medium. There are disclosed systems enabling use of the check character for detection, and correction or error indication, of character transposition errors occurring in a purported facsimile of the data word.

Figure 1B:
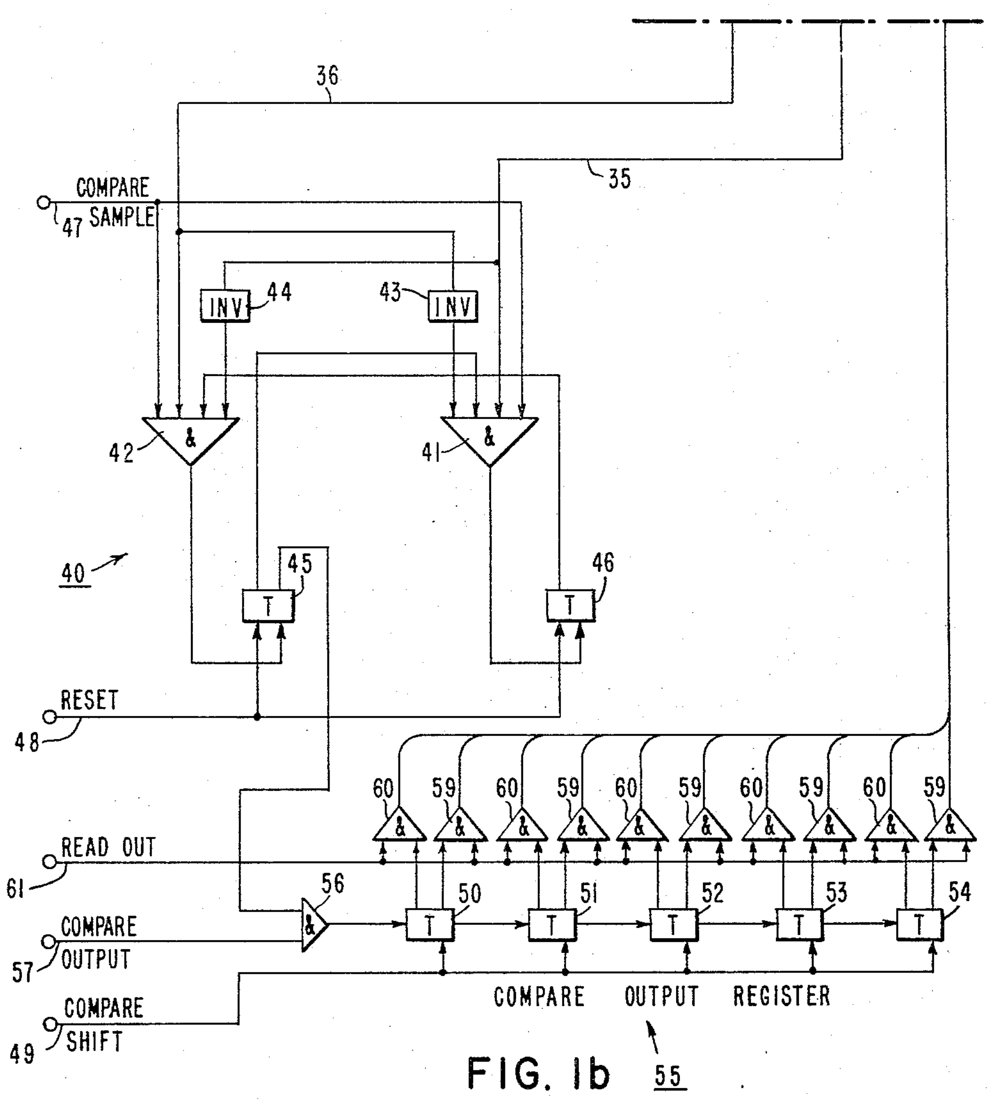

The present invention relates to systems for enabling detection of transposition errors in the subsequent reproduction of the symbolic format of a data word.

Present day business machine accounting practices record and translate data information as data words having alpha-numeric characters and symbols represented in individual identifiable coded form. The alphabetic characters, numerals, and symbols utilized in the communication of data information are referred to and identified herein for simplicity by the broad generic term "character." Business machine and accounting equipment often identify particular types, categories, classifications, and the like data information by particular key data words identifying numbers, credit card numbers, stock item catalogue numbers, prices and the like. These key data words are conveniently used in conjunction with all subsequent transactions involving the identified category of data information. For example, various debit charges made against an individual credit card are each associated with and identified by a key data word in the form of a number individual to the particular cerdit card concerned. Transactions are often reqired to be recorded by manual operations, such as by use of hand lettering or by typewriter or key punch to record various data on business machine input documents or appropriate recording media, and it is important that the key data word associated with the transaction be accurately recorded with the data of the transaction. It has been found in practice, however, that the originator of the document or recording is prone to create a transposition error involving the transposition or interchange of two adjacent characters of a data word thus to change the symbolic format and meaning of the word. It is particularly important that such transposition errors be avoided in originating or recording key data words concerned with and identifying other data with which the transaction is concerned. These transposition errors are easily made, but are difficult to detect because most error detection and correction procdeures heretofore proposed will treat a single transposition error as two substitution errors.

One arrangement heretofore proposed for accomplishing a more complete detection of transposition errors is that disclosed in the Luhn U.S. Patent No. 2,731,196. In the Luhn arrangement, the units position (lowest order position) digit and alternate higher-order digits of a numeric data word are replaced by substitute digits having preselected values related to those of the digits substituted. This procedure creates a new numeric data word in which the digits of the word may be added and, after casting out tens in the addition, the tens complement of the resulting digit is used as a key or check digit appended to the original numeric word. Upon later originating a key numeric word, the procedure just described is followed except that an uncomplemented key digit is derived for the word newly originated and this uncomplemented digit is added to the key digit of the original key data word. If the sum of this addition has other than zero value, an error in the newly created key word is indicated. No procedure is described for correction of an error so detected. The Luhn detection procedure cannot detect a transposition error involving a zero or 9 digit nor the substitution of a zero digit for a 9 digit or of a 9 digit for a zero digit.

One further arrangement proposed for detecting transposition errors contemplates the use of a system of key numeric data words wherein the digit values considered from highest to lowest digit orders have special significance. The value of each digit is considered with respect to the value of each of the lower ordered digits, and such consideration takes into account whether the higher order digit has higher numeric value than the value of each such lower ordered digit. A change from a greater to a lesser digit value is said to involve an "inversion" of digit values, and the number of such inversions is constrained to be either odd or even (but not odd and even) with respect to each key data word employed. A transposition then results in a change from an odd number of inversions where only odd-number inversion key words are used, or results in a change from an even number of inversions to an odd number thereof where only even-number inversion key words are used. This arrangement does not derive and associate as a component part of a key word a check digit useful in detecting digit transpositions, as in the Luhn arrangement above described, but rather relies simply upon a particular type of odd-even inversion key word format employed. Further, this prior art arrangement does not make it possible to correct an erroneous transposition found to exist in a key word.

It is an object of the present invention to provide a system enabling detection of transposition errors in reproducing the character format of a data word, including transposition of numeric digits having the values zero and 9.

It is a further object of the invention to provide a system for enabling detection and correction of a transposition error which is found to prevail in the character format of a key data word.

It is an additional object of the invention to provide a system for providing check characters each defining an individual pattern or individual patterns of change between higher and lower values with respect to preselected character positions of a key data word and particularly with respect to all pairs of adjacent character positions of the word.

It is yet a further object of the invention to provide a system for creating and utilizing check characters, or check character representative digits, enabling detection and unambiguous indication of a transposition error occurring between any pair of adjacent characters in a key data word even though such word has a relatively large number of characters in its format.

Figure 1:
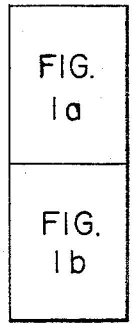
Figure 1A:
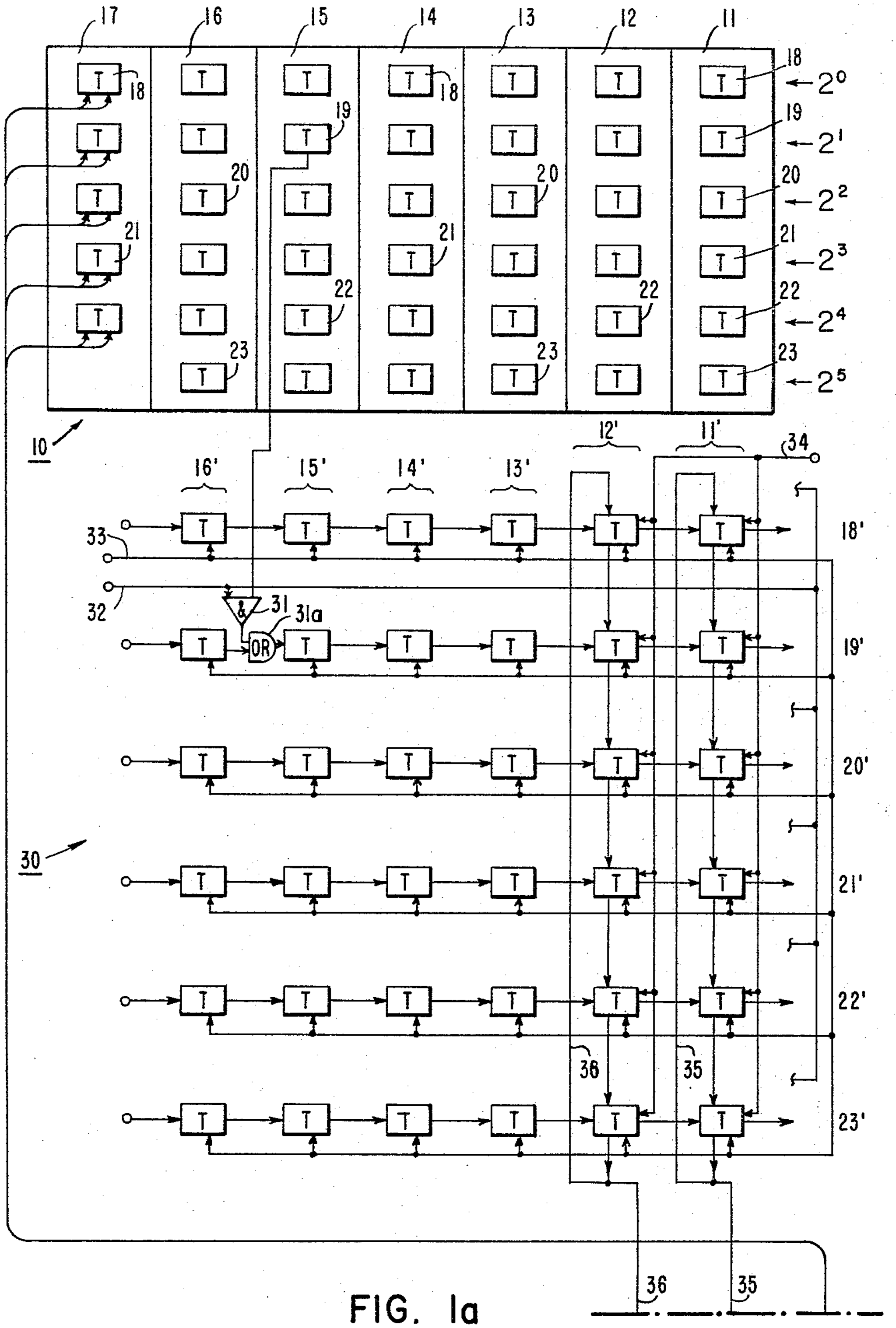
Figure 2:
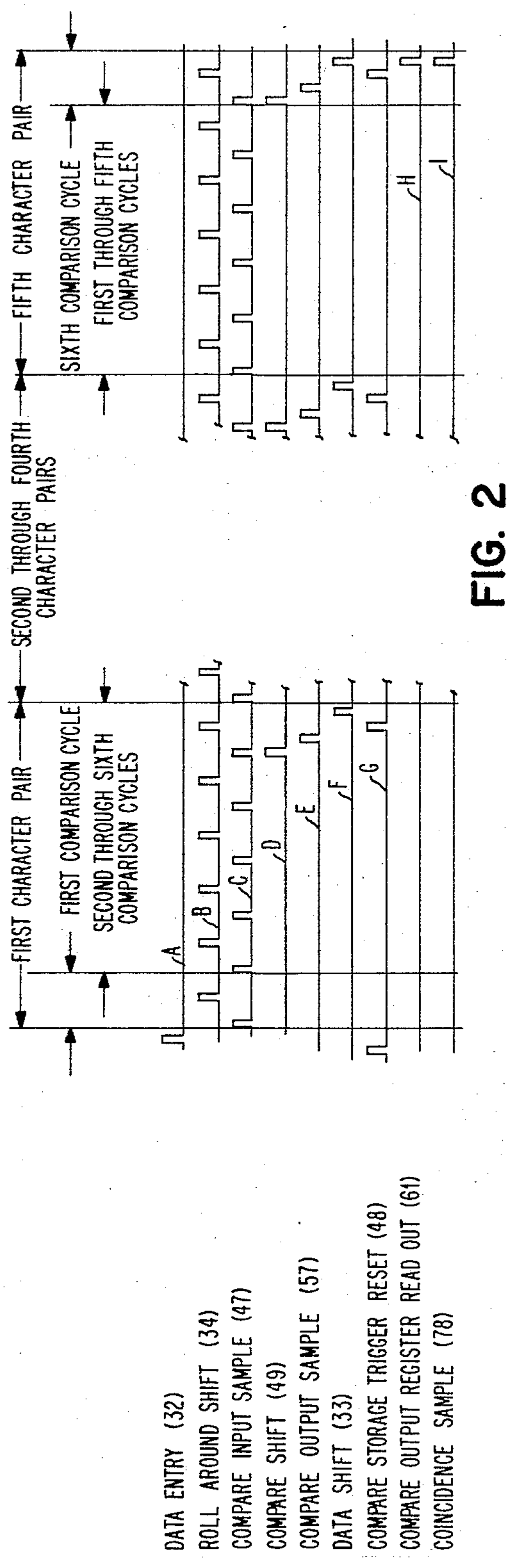
Figure 7:
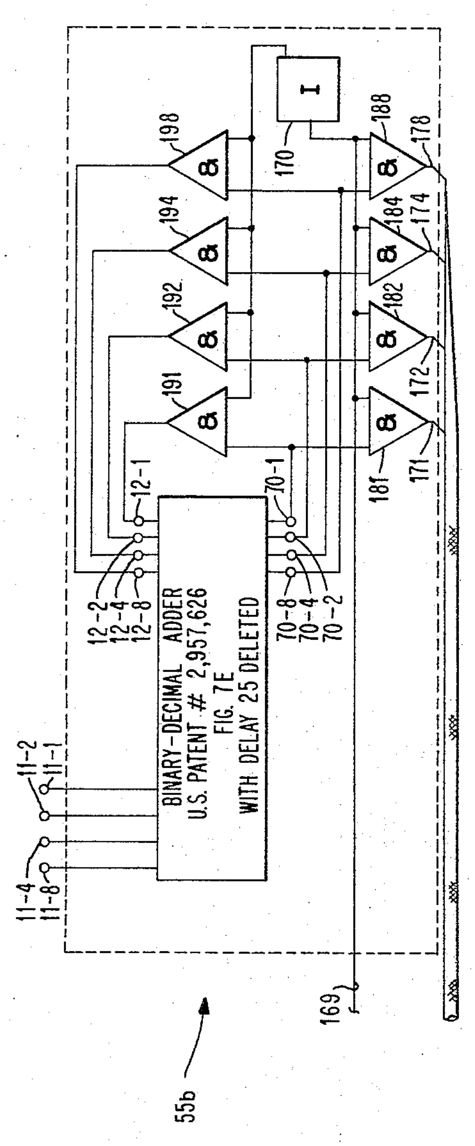
Figure 4:
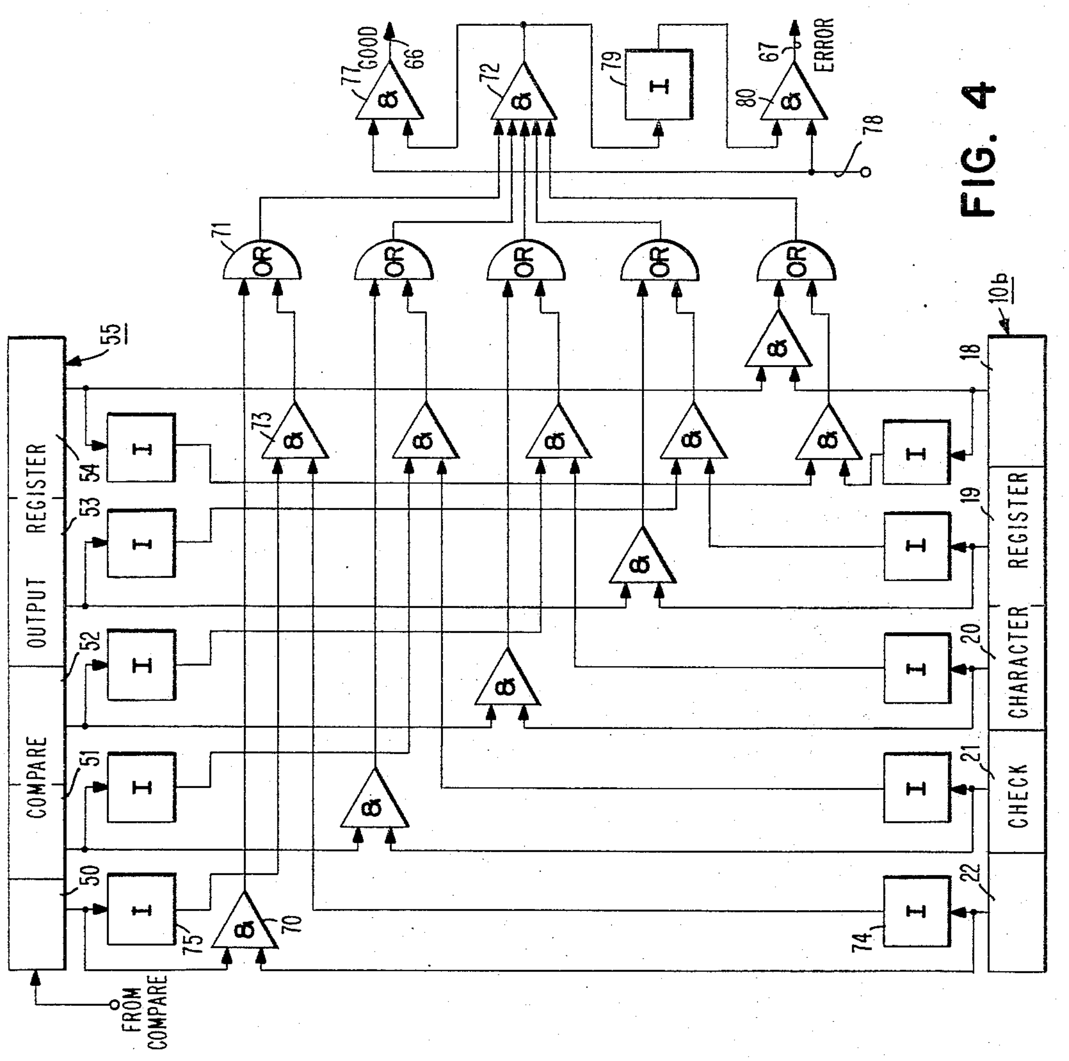
Figure 3:
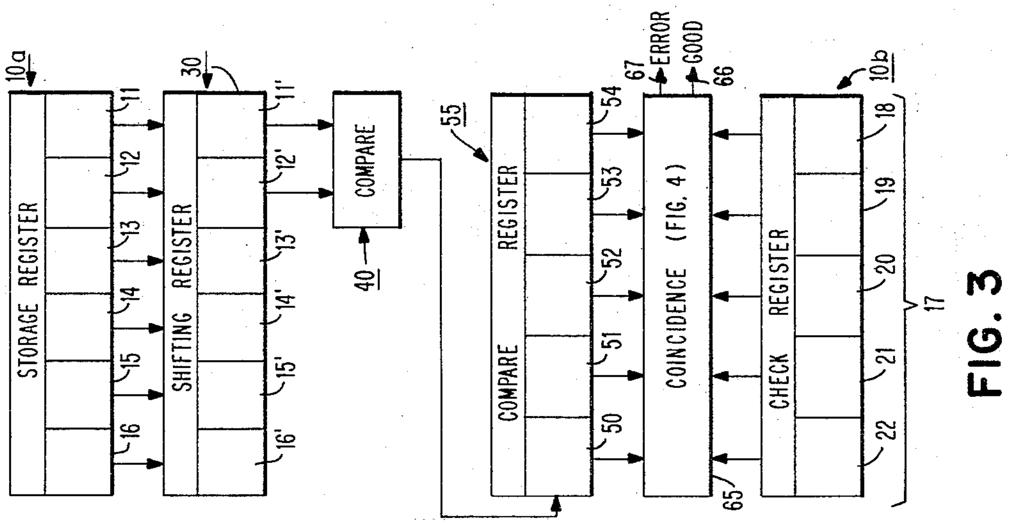
Figure 5:
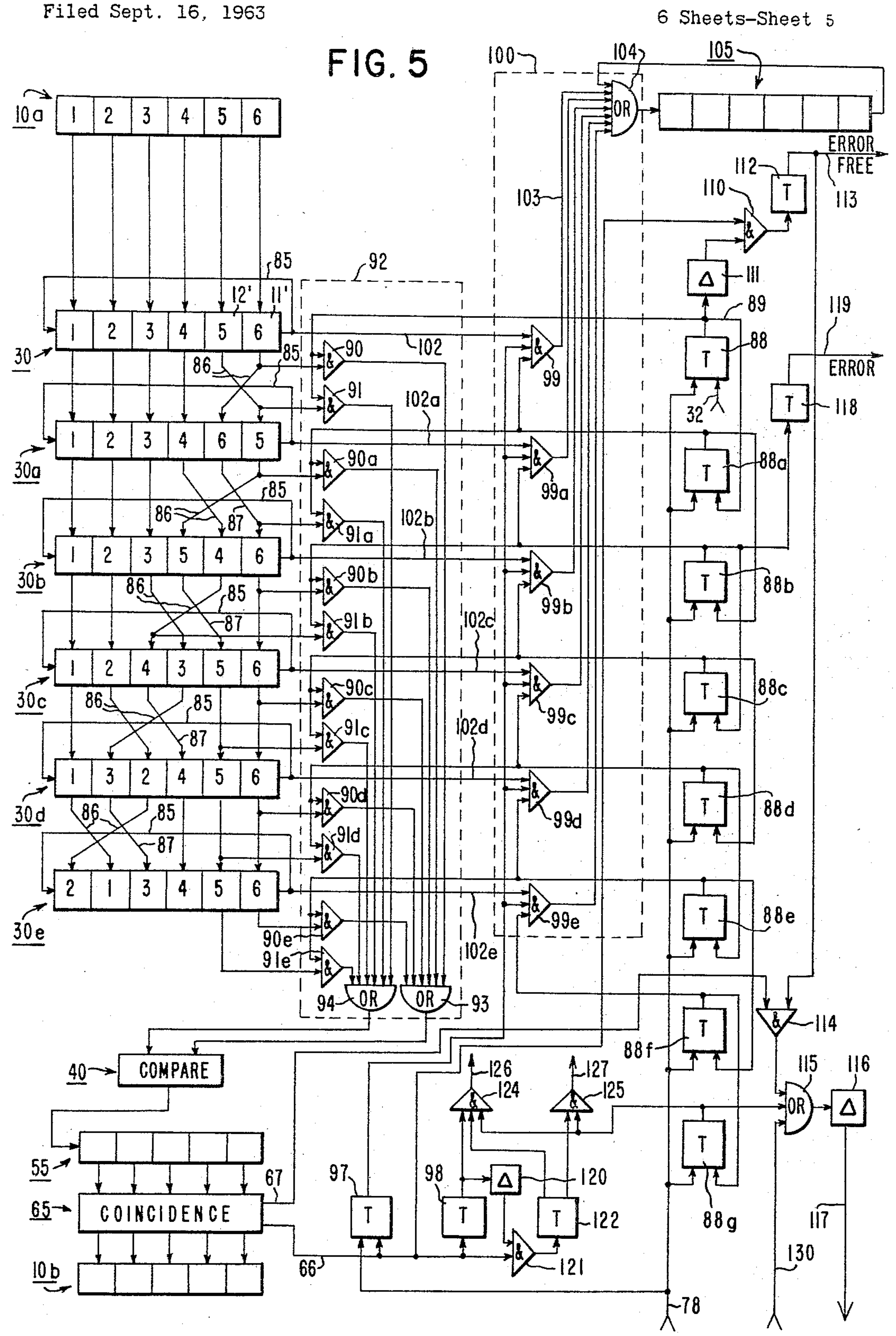
Figure 6:
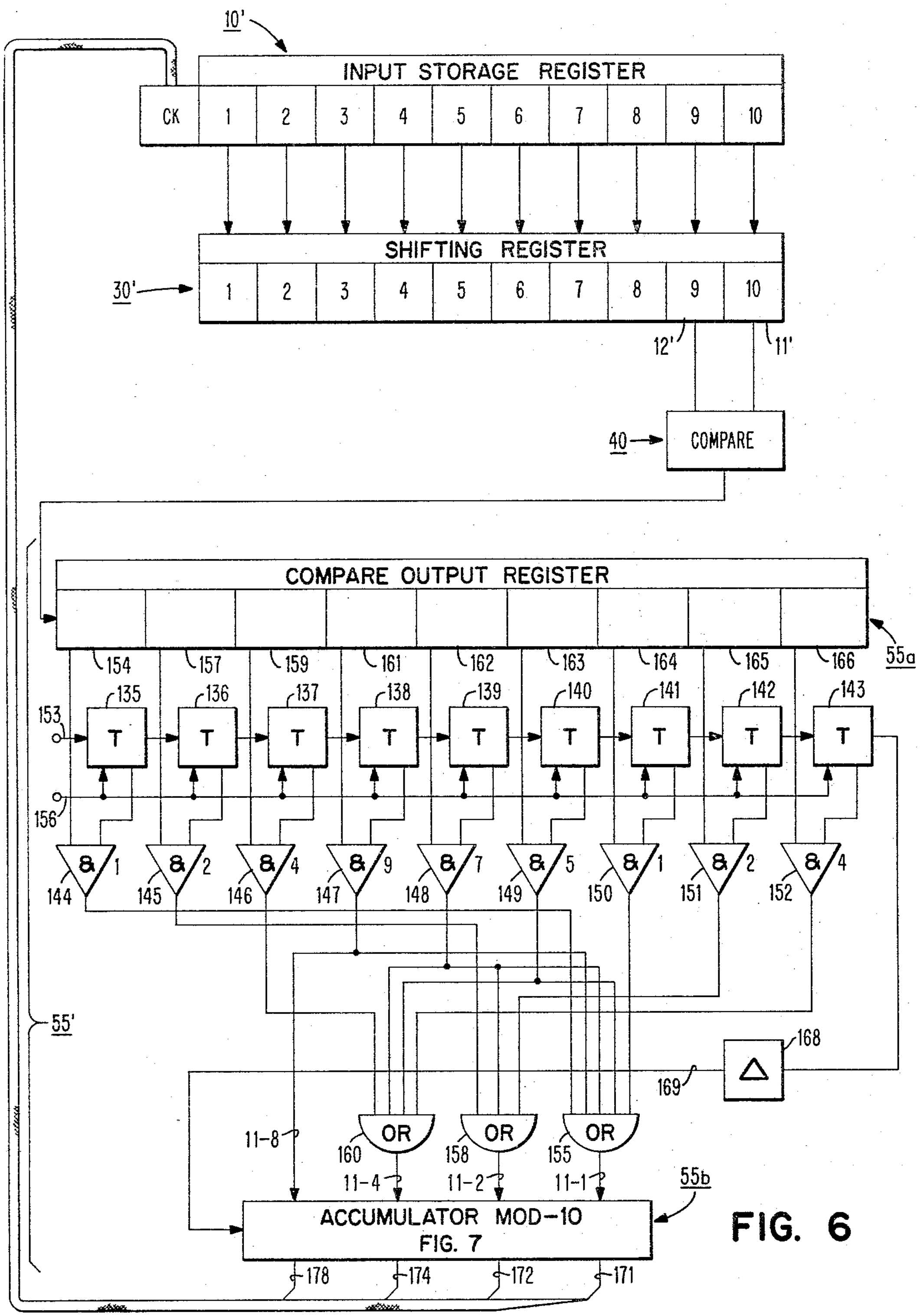

Other objects and advantages of the invention will appear as the detailed description thereof proceeds in the light of the drawings forming a part of this application and in which:

FIGS. 1*a* and 1*b* arranged as in FIG. 1 schematically represent a system embodying the invention in a particular form useful in creating check characters each defining a pattern of Hi-Lo value changes as between all pairs of adjacent data characters forming a key data word;

FIG. 2 graphically represents the pulse-time relationships of several potentials of pulse waveforms used in controlling operational steps of the FIG. 1 system;

FIG. 3 schematically represents a transposition error detection system embodying the invention, and FIG. 4 shows the circuit arrangement of a coincidence unit used in the FIG. 3 system;

FIG. 5 schematically represents a system embodying a form of the invention suitable for detecting and correcting a single transposition error or the detection and indication of plural transposition errors but without correction of any thereof;

FIG. 6 schematically represents a modified form of the invention wherein a check character is converted to a check digit which enables detection and correction of a transposition error; and FIG. 7 shows schematically the more detailed arrangement of an accumulator used in the FIG. 6 system.

Referring now to FIGS. 1*a* and 1*b* of the drawings, the system schematically shown derives and combines with a key data word a check character enabling detection of transpositions of all adjacent pairs of characters making up the format of the key word. In particular, each derived check character defines an individual pattern of changes between higher and lower values of all pairs of adjacent data-word characters. For this purpose, the system includes a conventional storage register 10 which is shown by way of example as having a capacity for storing a key data word including as many as six data characters in its format. The six data character storage units are identified from lower to higher order character positions as 11–16, and the storage register 10 also includes a check character storage position 17 into which a generated check character is ultimately inserted for storage in association with the stored key data word. Each data character is stored in binary code format, and the binary code bits making up this format are stored in conventional manner by storage triggers provided in each character storage unit. The data character storage units 11–16 each include six such binary bit storage triggers 18–23 arranged in order from the lowest-order binary bit of value $2^0$ to the highest-order binary bit of value $2^5$ as shown. The availability of six binary code bits enables the customary identification, by individually assigned numeric-valued codes, of each of the numeric digit characters 0–9, each alphabetic character in an alphabet, and numerous punctuation and special symbol characters. It is the usual practice to assign numeric-valued codes 0–9 to the corresponding numeric digit characters, to assign the numeric-valued codes 10–35 to the alphbetic characters, and to assign higher numeric-valued codes to various symbol characters. The check character above mentioned may also be considered as represented in binary coded form, but will include only a maximum of five code bits so that the check character storage unit 17 includes only five bit storage triggers 18–22. The storage register 10 thus is of conventional storage-trigger register type to receive from a source, not shown, a key data word for which a check character is to be generated and stored in association therewith.

The FIG. 1 system also includes a shifting register 30 having a plurality of code bit storage triggers arranged in character trigger columns 11′–16′ and binary bit rows 18′–23′ to provide a storage trigger array corresponding to that of the storage units 11–16 of the register 10. As particularly shown with respect to the storage trigger 19 of the data character storage unit 15 but not shown for simplicity of illustration with respect to the triggers of the other storage units, binary 1 code bits stored in the triggers of the register 10 may be transferred through AND gates 21 and OR units **31*a* to storage in a corresponding one of the storage triggers of the shifting register 30. Prior to such data transfer, the storage triggers of the register 30 are automatically cleared of previously stored data by an operational process presently to be described so that it is unnecessary to transfer zero code bits from the triggers to the register 10 to the triggers of the register 30. Thus the data characters of a key data word stored in the register 10 are transferred to storage in the shifting register 30. Such transfer is effected upon energization of a transfer circuit 32 by a data entry potential pulse, shown as curve A of FIG. 2, generated at the time such transfer is desired. The shifting register 30 has its rows of storage triggers coupled in conventional manner to transfer stored binary code bits from column to column of the storage triggers (i.e. from the trigger column 16′ toward the trigger column 11′) upon each energization of a shift control circuit 33 energized by periodic data shift potential pulses. The interconnections of the rows of storage triggers for this purpose may be that shown and described on pages 144–146 of Digital Computers, by R. K. Richards, published by D. Van Nostrand Co., Inc., New York, N.Y. (copyright 1955). The columns 11′ and 12′ of storage triggers are also similarly intercoupled to effect shift of binary bits stored in these triggers from one trigger to a succeeding trigger as arranged in columns and from the trigger row 18′ toward the trigger rod 23′. This latter form of data information shift is conveniently referred to as "rolling" the storage triggers by individual columns, and is effected by energization of a shift circuit 34 by periodic roll-around shift potential pulses shown by curve B of FIG. 2. The end storage triggers 18′ and 23′ of the trigger columns 11′ and 12′ are coupled by respective circuits 35 and 36 to transfer bits stored in the output triggers 23′ of a given column to the input triggers 18′ of that column, thus to preserve the data character stored in a column upon completion of a roll-around shift operation. In contrast, shift of stored information by data storage rows under control of the shift circuit 33 clears information from the shift storage register 30 since the output storage triggers in the row 11′ thereof are not coupled to return stored information to an associated one of the input storage triggers in the row 16′**.

The data character code bits read out of the output triggers 23′ of the trigger columns 11′ and 12′ are applied through the output circuits 35 and 36 to a compare unit 40. This unit includes an AND gate 41 having the output circuit 35 as one of its inputs, and includes an AND gate 42 having the output circuit 36 as one of its inputs. A second input circuit of the AND gate 41 is comprised by the output circuit of an inverter 43 having an input circuit coupled to the output circuit 36, and a second input circuit of the AND gate 42 is comprised by the output circuit of an inverter 44 having an input circuit coupled to the output circuit 35. A third input circuit of the AND gate 41 is comprised by the OFF output circuit of a compare storage trigger 45, which is normally reset OFF but is turned ON by a pulse potential translated by the AND gate 42. A third input circuit of the AND gate 42 similarly is comprised by the OFF output circuit of a compare storage trigger 46, which likewise is normally reset OFF but is turned ON by a potential pulse translated by the AND gate 41. A fourth input circuit of each of the AND gates 41 and 42 is comprised by a compare sample circuit 47 which is energized by a compare sample pulse potential shown as curve C of FIG. 2.

The successive pairs of data character binary code bits translated through the output circuits 35 and 36 upon each roll operation of the trigger columns 11′ and 12′ are presented to the compare unit 40 in order from the highest valued code bits to the lowest valued mode bits. As the initial highest valued code bits are applied to the AND gates 41 and 42, a compare input sample potential pulse is concurrently applied to these gates by the circuit 47. A 1 code bit in the output circuit 35 will cause the AND gate 41 to translate the compare potential pulse of the compare circuit 47 unless a 1 code bit also appears at this time in the output circuit 36 to close the AND gate 41 through the inverter 43. Likewise a 1 code bit in the output circuit 36 will cause the AND gate 42 to translate the compare potential pulse of the compare circuit 47 unless a 1 code bit concurrently appears in the output circuit 35 to close the AND gate 42 through the inverter 44. It will thus be evident that neither of the AND gates 41 or 42 translates the compare potential pulse of the compare circuit 47 either if a binary 1 appears or does not appear concurrently in both of the output circuits 35 and 36. If, however, a binary 1 code bit appears in the output circuit 35 concurrently with the absence of a binary 1 code bit in the output circuit 36, the AND gate 41 alone will translate a compare potential pulse to turn ON the compare trigger 46 and thus indicate that the data character stored in the trigger column 11′ has higher value than that stored in the trigger column 12′. Likewise if the binary 1 bit appears in the output circuit 36 concurrently with the absence of a binary 1 bit in the output circuit 35, only the AND gate 42 will translate a compare potential pulse to turn ON the compare trigger 45 and thus indicate that the data character stored in the trigger column 12′ has higher value than that stored in the trigger column 11′. Turn ON of either of the triggers 45 or 46 provides the Hi-Lo evaluation desired and prevents subsequent turn ON of the other of these triggers by closing the AND gate 41 or 42 associated with that trigger. Accordingly upon completion of the roll around operation of the trigger columns 11′ and 12′, and the comparison by the unit 40 of equal valued pairs of binary code bits of the data characters stored in these trigger columns, the concurrent OFF state of the compare triggers 45 and 46 provides an indication that the data characters have equal value whereas the ON state of the compare trigger 45 provides an indication that the data character stored in the trigger column 12′ is of larger value than that stored in the trigger column 11′ or the ON state of the compare trigger 46 provides an indication that the data character stored in the trigger column 11′ has a higher value than that stored in the trigger column 12′.

Upon completion of the compare operation, a compare shift pulse potential (curve D of FIG. 2) is supplied through a compare shift circuit 49 to a plurality of check character binary code storage triggers 50–54. Thereafter the ON state of the compare trigger 45 is applied through an AND gate 56, conditioned by a compare output sample potential pulse (curve E of FIG. 2) supplied through a compare output circuit 57, to turn ON the bit storage trigger 50 and store the first binary code bit of a check character presently in process of being generated. The OFF state of the trigger 45 at this time leaves the code bit trigger 50 storing a binary zero.

This completes a first compare cycle of operation by which the values of the data characters stored in the trigger columns 11′ and 12′ of the shift storage register 30 are compared to determine whether they are of equal value or whether one is of higher value than the other. The result of this comparison is stored as a binary 1 or zero bit in the storage trigger 50 as last explained. Thereupon a shift potential pulse shown by curve F of FIG. 2 is applied to the shift circuit 33 to effect shift of all data characters stored in the register 30 with the shift occurring, as previously explained, in the direction from the trigger column 16′ toward the trigger column 11′. This shift operation destroys the data character stored in the trigger column 11′, transfers the data character previously stored in the trigger column 12′ into the trigger column 11′, and transfers the data character previously stored in the trigger column 13′ into the trigger column 12′. The triggers 45 and 46 are now both reset OFF by a reset pulse potential, shown as curve G of FIG. 2, applied to the reset circuit 48 to place these triggers in readiness for the next compare cycle of operation. Thereupon a second cycle of compare operation is initiated, and this compare cycle progresses to completion to generate and store in the check character code bit storage trigger 50 a second check character code bit after shift of the first check character code bit to storage in the trigger 51. This is followed by a further shift of the shift storage register 30 and a further compare operation to derive a third code bit of the check character which is likewise stored in the code bit trigger 50 after shift of the two previously generated check character code bits to the storage triggers 51 and 52.

Accordingly a series of shift operations of the shift register 30 and accompanying series of compare operations generates and stores in the check character code bit storage triggers 50–54 a check character which identifies a particular pattern of Hi-Lo value changes between all pairs of adjacent characters of the data word stored in the register 10 and placed in storage in the shift register 30. A zero binary bit of the check character indicates that a data character stored in the register 10 to the left of another data character has equal or lower value than the latter, whereas a 1 code bit of the check character indicates that the value of a data character stored in the register 10 to the left of another data character has higher value than the latter. The check character accordingly indicates consecutive changes to higher or lower values of data characters stored in the register 10 and considered in order from the data storage unit 11 to the storage unit 16. It will perhaps be informative to consider the effect of these operations by way of an example. Assume that the storage register 10 stores the data word HA–449 and that these characters have the assigned values, considered in order from left to right, 17–10–37–4–4–9. As described above, the Hi-Lo comparisons progress from right to left of the data word so that the first comparison of the characters 4 and 9 provides a Lo indication. A second comparison of the characters 4 and 4 provides an equal indication, which is treated as being the same as a low indication. The third comparison of the symbol character "—" and the character 4 provides a high indication. The fourth comparison of the character "—" and the character A provides a Lo indication, while the fifth comparison between the characters A and H provides a high indication. Since a Hi comparison results in the storage of a binary 1 bit in generating the check character, the result of the operations here assumed results in the generation of a check character having the binary value 1–0–1–0–0. This check character, which may be considered in binary notation to have the value 20, assigned to the alphabet character "K," defines an individual and specific pattern of Hi-Lo value changes between all pairs of adjacent characters of the data word considered in the direction from the lowest order character position to the highest order character position of the data word. It will be evident from this that a transposition of any two characters of the data word will result in a different check character of different binary format and thus different value, so that the check character derived with a transposition error will not be the same as the check character "K" derived from a correct data word.

The check character generated in the compare output register 55 in the manner just described is stored in the character position 17 of the register 10. To this end, each of the storage triggers 50–54 has its 1 output circuit coupled to an AND gate 59 and its zero output circuit coupled to an AND gate 60. All of these AND gates 59 and 60 are concurrently conditioned by a compare output register read out potential pulse (shown as curve H of FIG. 2) applied to a control circuit 61 so that the binary bits stored in the register triggers 50–54 are translated to storage in the respective storage triggers 22–18 where the check character is available in association with the stored data word to be transferred as a composite data word and check charatcer to storage in another storage device or storage medium not shown.

FIG. 3 schematically represents a transposition detection system utilizing a previously generated check character which is known to identify a correct form of data word free of any transposition error. Components in FIG. 3 corresponding to similar components of FIG. 1 are identified by similar reference numerals, and it will be noted that the storage register 10 is shown for convenience in FIG. 3 as comprising a portion **10*a* including character storage positions 11–16 and a register portion 10*b* which includes the check character storage position 17. A data word with its associated check character, newly created in recording a particular transaction, is inserted directly or through intermediate storage into the storage register portions 10*a* and 10*b* with the data characters being placed in register portion 10*a* and the check character being placed in the register portion 10*b*. The data word characters are thereupon transferred to the shift register 30 as described in connection with FIG. 1, and all pairs of adjacent characters are then compared by the compare unit 40 to generate and store in the compare output register 55 a check character defining a pattern of Hi-Lo value changes as between all pairs of adjacent characters of the data word inserted in the shift register 30. The cyclic compare operation in accomplishing the generation and insertion in the register 55 of this check character is that described above in connection with FIG. 1. The check character thus generated and inserted in the register 55 is now compared by correspondingly valued binary code bits with the check character stored in the register portion 10*b*. This comparison is accomplished by a coincidence unit 65 (hereinafter described more fully) having a first output circuit 66 in which a pulse potential may appear to provide a "good" indication upon a finding of identity of the check characters stored in the register 55 and register portion 10*b*. The unit 65 has a second output circuit 67** in which a pulse potential may appear to provide an error indication upon a finding of lack of identity of the two check characters such as would be occasioned by a transposition error in the newly created data word. The "good" indication thus provided may be used as desired in a particular application, such as to provide a visual indication to a machine operator that a particular key data word used in a transaction recording is correct and free of transposition errors or alternatively is erroneous as containing a transposition error and therefore should be further verified for correctness before utilization.

The circuit arrangement of the coincidence unit 65 utilized in the FIG. 3 arrangement conveniently has the circuit arrangement shown in FIG. 4 which, for clarity of illustration, also shows the association of the coincidence unit with the check character register 55 and check character storage portion **10*b* previously considered in connection with FIG. 3. The coincidence unit 65 includes five branches of identical circuit construction and which are connected between corresponding binary code bit storage positions of the register 55 and register portion 10*b*. Consider by way of example the particular branch of the coincidence unit 65 which is connected between the binary bit storage trigger 50 of the register 55 and the bit storage trigger 22 of the register portion 10*b*. This branch includes an AND gate 70 having two input circuits which are energized by the binary 1 output circuits of the storage triggers 22 and 50, so that the storage of a binary 1 code bit in the storage triggers 22 and 50 will fully condition the AND gate 70 to translate a potential through an OR unit 71 to one input circuit of an output AND gate 72 of the coincidence unit. This branch further includes an AND gate 73 having two input circuits which are energized through inverters 74 and 75 which have input circuits connected to the binary 1 output circuits of the respective storage triggers 22 and 50. Thus the storage of a binary zero code bit in the storage triggers 22 and 50 causes both of the inverters 74 and 75 to condition the AND gate 73 to translate a potential through the OR unit 71 to the earlier mentioned input circuit of the output AND gate 72. It will be evident that the storage of a binary 1 code bit in one of the storage triggers 22 or 50 and the concurrent storage of a zero binary code bit in the other thereof has the result that neither of the AND gates 70 or 73 is fully conditioned to energize the first input circuit of the output AND gate 72 through the OR unit 71. In other words, this first input circuit of the output AND gate 72 is energized by one of the AND gates 70 or 73 only when there is identity of binary code bit storage in the storage triggers 22 and 50. Each of the other four branches of the coincidence unit 65 similarly energize other input circuits of the output AND gate 72, and it will be evident that the output AND gate 72 is fully conditioned to develop a potential in its output circuit only under the condition that there is an identity between the binary code bits stored in the storage triggers of the register 55 and the binary code bits stored in corresponding ones of the storage triggers of the register portion 10*b*. An output potential developed in the output circuit of the AND gate 72, as indicating identity of binary code bit format of the check characters stored in the register 55 and the register portion 10*b*, is translated through an AND gate 77 to the good output circuit 66 upon the conditioning of a second input circuit of the AND gate 77 by a coincidence sample pulse potential (curve I of FIG. 2) applied to a control circuit 78. In the absence of energization of the output circuit of the AND gate 72, by reason of lack of identity of the check characters stored in the register 55 and register portion 10*b*, an inverter 79 conditions an AND gate 80 to energize the error output circuit 67 of the coincidence unit upon application to a second input circuit of the AND gate 80 of the coincidence sample potential pulse applied to the control circuit 78**.

FIG. 5 schematically represents a system which not only detects transposition errors but also enables correction of a single transposition error or the indication of plural transposition errors without correction of any thereof. As in the FIG. 3 system above described, the characters of a data word are inserted into storage in the register portion **10*a* and the associated check character is inserted into storage in the register portion 10*b*. The present system, however, includes plural shifting registers 30–30*e*** having identical constructions like that described in connection with FIG. 1 but with the difference that the output circuits of triggers in the character trigger column 11′ are coupled to the binary input circuits of the triggers in the character trigger column 16′ as indicated by the circuit channel 85 shown in association with each of the registers 30–30*e*. Thus data code bits are circulated through each register as data characters are shifted in the register, and the original data word inserted into the register is preserved upon completion of each shifting operation. Prior to insertion of any data into these shifting registers, data previously stored therein is cleared by a clearing pulse potential at a time and in a manner presently to be described. After clearing the shifting registers, the characters of a data word stored in the register portion 10*a* are transferred to corresponding character storage positions in the stepping register 30 and are concurrently stored in the stepping registers 30*a*–30*e* but with a transposition of adjacent character positions as indicated by the crossed transfer circuits 86 shown between the registers 30 and 30*a* and the crossed transfer circuits 86 and a character-position restoring transfer circuit 87 shown between each succeeding pair of the registers 30*a*–30*e*.

The transfer entry pulse potential which was applied to the control circuit 32 in FIG. 1 to effect the character transfer storage operation last described is also applied to an input circuit of a trigger 88 to turn the latter ON and develop an elevated potential in its output circuit 89. This output potential is applied in common to input circuits of a pair of AND gates 90 and 91 of an AND-OR unit 92, and additional input circuits of the AND gates 90 and 91 are coupled to the binary 1 output circuits of the highest order binary triggers in the character columns 11′ and 12′ of the stepping register 30. The output circuits of the AND gates 90 and 91 are coupled through respective OR units 93 and 94 to the compare unit 40 to derive and store in the compare output register 55 a check character in the same manner as described in connection with FIG. 1. The check character thus generated and stored is compared by the coincidence unit 65 in the same manner as described with relation to FIG. 3, and identity between the check characters stored in the register 55 and the register portion 10*b* develops a pulse potential in the output circuit 66 of the coincidence unit 65 as previously explained. This potential pulse is applied to the turn ON input circuit of check good triggers 97 and 98 to turn these triggers to their ON state. The now ON state of the trigger 97 conditions a control circuit of an AND unit 99 included in an AND-OR unit 100. A second input control circuit of the AND gate unit 99 is conditioned by the turn ON of a trigger 88*a* in response to turn OFF of the trigger 88 by the same coincidence sample pulse which was applied to the coincidence unit 65 to energize its output circuit 66 and which is now also applied through the control circuit 78 to the turn OFF input circuit of the trigger 88. The AND unit 99 includes twelve binary 1 and binary 0 input circuits which are shown schematically as coupled by a channel 102 to the binary 1 and binary 0 output circuits of the six storage triggers in the trigger column 11′ of the storage register 30. When the two control circuits of the AND unit 99 are conditioned as just described, the twelve input AND circuits associated with the channel 102 are all conditioned to translate through a channel 103 and an OR unit 104 the binary code bits stored in the trigger column 11′ of the register 30 and these translated code bits are translated to storage in corresponding ones of an input column of storage triggers included in a stepping register 105. The stepping register 105 is stepped in synchronism with a further cycle of stepping operation of the register 30, so that the data characters stored in the latter are stepped into storage in corresponding character positions of the stepping register 105. This preserves in the latter register the data word which was found by operation of the coincidence circuit 65 to be free of character transposition errors.

At the time the output circuit 66 of the coincidence unit 65 was energized by a pulse potential as previously described and while the trigger 88 was yet turned ON, one input circuit of an AND gate 110 is energized by the pulse potential appearing in the coincidence unit output circuit 66 while a second input circuit of this AND gate is energized through a delay unit 111 from the ON output circuit 89 of the trigger 88. The AND gate 110 is thereupon conditioned to translate to its output circuit the potential pulse developed in the coincidence unit output circuit 66, and this translated pulse is applied to the turn ON input circuit of a trigger 112 to develop in the ON output circuit 113 of the latter an elevated potential which may be used to indicate that the data word stored as just described in the register 105 is free of transposition errors and accordingly is suitable for recording or such other use as may be desired. The coincidence sample pulse which is applied to the circuit 78 to turn the trigger 88*a* OFF also is applied to a turn OFF input circuit of the trigger 97 to turn this trigger OFF.

All of the stepping registers 30*a*–30*e* are stepped in synchronism with the stepping of the register 30, thus effecting repetitive recirculations of the data characters stored in each register. As the stepping register 30*a* steps in synchronism with the second cycle of stepping operation of the stepping register 30 while the latter translates its data characters to storage in the register 105 as last described, the ON state of the trigger 88*a* conditions AND gates 90*a* and 91*a* to translate successive pairs of adjacent characters from the register 30*a* through the OR units 93 and 94 to the compare unit 40 for purposes of generating and storing a check character in the register 55. Since the data word was stored in the register 30*a* with two characters transposed, the check character generated and stored in the register 55 should not be found identical to that stored in the register portion 10*b* under the conditions above described and wherein the data word stored in the register 30 was found to be free of transposition errors. Accordingly the lack of identity of the check characters in the register 55 and register portion 10*b* will effect energization of the error output circuit 67 of the coincidence unit 65 by the coincidence sample pulse potential applied to the unit 65 as previously described. The sample coincidence pulse potential thus developed at this time in the output circuit 67 is translated by an AND gate 114, which is also conditioned by the elevated potential developed at this time in the output circuit 113 of the trigger 112, and is further translated by an OR unit 115 and a delay unit 116 to a reset control circuit 117. While not specifically shown for simplicity of illustration, the reset pulse potential developed in the reset circuit 117 is utilized to reset all control and storage triggers of the present system to their OFF state except for the storage triggers of the register 105, thus clearing all previously stored data from the storage register portions 10*a* and 10*b* and the registers 30 and 30*a*–30*e*.

The foregoing described operation was premised upon the condition that the data word stored in the register 30 was found to be free of transposition errors. Had this error free condition not prevailed, the output circuit 67 of the coincidence unit 65 would have been energized rather than the output circuit 66 and neither of the triggers 97 and 98 would have been turned ON. However, the coincidence sample pulses which energize either of the output circuits 66 or 67 of the coincidence unit 65 also are applied through the control circuit 78 to the turn OFF input circuits of the trigger 88 and each of the triggers 88*a*–88*f* of which the triggers 88*a*–88*e* control corresponding pairs of the AND gates of the unit 92 associated with corresponding ones of the stepping registers 30*a*–30*e*. As each of the triggers 88 and 88*a*–88*e* turn OFF, it effects turn ON of the succeeding trigger in order from the trigger 88*a* to the trigger 88*f*. It will be apparent from the foregoing description of the system operation that the ON state of each of the triggers 88a–88e causes generation and storage in the register 55 of a check character according to the data characters stored in a corresponding one of the registers 30a–30e. If the data characters stored in the register 30 are found to have a transportation error, one of the differing transposed character positions of the data stored in the registers 30a–30e should avoid the transposition error and thus correct it. Assume that the transposition error is corrected by the transposition with which the data characters are stored in register 30a. When this data is used to generate and store a check character in the register 55, the coincidence unit 65 will find identity between this check character and that stored in the check register portion 10b so that the ensuing operation will be that first described in which the triggers 97 and 98 are turned ON and the data word stored in the register 30a will be translated to storage in the register 105. There is the difference in this operation, however, that it does not halt with this finding that the data characters in the register 30a appear to be free of transposiion error. Rather, in this instance the operation proceeds and the turn OFF of the trigger 88a with resultant turn ON of the succeeding trigger 88b causes the ON output circuit of the latter to turn ON a trigger 118. The elevated potential thereupon developed in the ON output circuit 119 of the latter signifies failure to find freedom of transposition error in the key data word stored in the register 30. In this changed form of system operation, check characters are successively generated and stored in the register 55 by data information translated to the compare unit 40 from successive ones of the registers 30b–30e. Should a second apparent freedom from transposition error be found to prevail in the data word stored in one of these registers, which is highly unlikely, the now ON state of the trigger 98 will condition through a delay unit 120 an AND gate 121 so that the second pulse energization of the output circuit 66 of the coincidence unit 65 will now be translated by the AND gate 121 to turn ON a trigger 122 to indicate that two different character transpositions appear to provide a data word free of transposition errors. When this operation has progressed through a test of the data word stored in the register 30e and the corresponding trigger 88e turns OFF, a trigger 88f turns ON to effect storage in the register 105 of the data word characters stored in the register 30e if this data word appears to be free of transposition errors so that the trigger 97 is again turned ON. Accordingly the register 105 stores the last tested data word which so appears to be free of transposition error.

Upon turn OFF of the trigger 88f, a trigger 88g is turned ON to condition one input circuit of a pair of AND gates 124 and 125. The AND gate 124 is fully conditioned to develop a potential in its output circuit 126 by the ON state of the trigger 98 and the OFF state of the trigger 122 thus to provide an indication that the data word stored in only one of the registers 30a–30e, and accordingly that now stored in the register 105, is free of transposition error. The AND gate 125 is conditioned by the ON state of the trigger 122 to develop in its output circuit 127 a potential indicating that the data word stored in two or more of the registers 30–30e appear free of transposition error. The elevated potential developed in the ON output circuit of the trigger 88g is also translated by the OR unit 115 and the delay unit 116 to develop a reset pulse potential in the reset circuit 117 which, as previously explained, effects reset to their OFF state of all control triggers and of all data storage triggers with the exception of the storage triggers in the register 105.

Upon initial energization of the check and correction system above described, and as a safeguard against circuit malfunction prior to each entry of data characters into the register portion 10a and a check character into the register portion 10b, a reset input circuit 130 is preferably energized for translation of a potential through the OR unit 115 and delay unit 116 to generate a reset pulse in the reset circuit 117 for purposes of resetting the control and storage triggers as previously explained.

FIG. 6 schematically represents a system for generating a check character in the manner previously explained and for thereafter converting this check character to a single check digit which enables detection of transposition errors prevailing in a key data word having a significantly larger number of data characters than the data words heretofore considered. The FIG. 6 arrangement is essentially similar to that described in connection with FIG. 1 except for certain differences hereinafter explained, and components in FIG. 6 which correspond to similar components of FIG. 1 are identified by similar reference numerals while analogous components are identified by similar reference numerals primed.

The key data word storage register 10' of FIG. 6 is shown as having a storage capacity capable of storing ten data characters together with an associated check character. The data characters are transferred from the register 10' to a shifting register 30' in the same manner as explained in connection with FIG. 1, the register 30' being enlarged to accept and store the ten characters of the key data word. Also as in the arrangement of FIG. 1, the lowest order character storage columns 11' and 12' are rolled and the register 30' is periodically stepped to generate by operation of the compare unit 40 successive binary code bits of a check character which are inserted into and stored by stepped operation of a compare output register 55a corresponding, except for its larger size, to the register 55 of FIG. 1. Since the check character thus generated and stored in the register 55a will now have a total of nine code bits corresponding to the Hi-Lo comparisons of the ten data characters, it is evident that the storage of this check character in the register 10' would require at least two character storage positions. Rather than storing the check character in this manner, however, the present system converts the check character to a single check digit which may be stored in a single character storage position of the register 10' and yet retains the ability to detect without ambiguity a transposition error which may prevail in a subsequent reproduction or origination of the key data word.

The FIG. 6 system includes a plurality of triggers 135–143 which in their ON states condition an input circuit of respective AND gates 144–152 as shown. Upon completion of generation and storage of the check character in the compare output register 55a, the trigger 135 is turned ON by a potential pulse applied to a turn ON input circuit 153 of this trigger. With the trigger 135 ON, the presence of a 1 binary code bit in the input storage trigger 154 of the register 55a causes the AND gate 144 to inject through an OR unit 155 a binary 1 digit into a one-position accumulator 55b. An advance circuit 156 is now energized with a periodic pulse advance potential which turns the triggers 135–143 ON and OFF successively in the direction from the trigger 135 toward the trigger 143. During the ON state of the trigger 136, a binary 1 stored in the storage trigger 157 of the register 55a causes the AND gate 145 to inject through an OR unit 158 a binary 2 into the accumulator 55b. During the ON state of the trigger 137, a binary 1 stored in the trigger 149 of the register 55a causes the AND gate 146 to insert through an OR unit 160 a binary 4 into the accumulator 55b. During the ON state of the trigger 138, a binary 1 stored in the trigger 161 of thhe register 55b causes the AND gate 147 to insert concurrently a binary 1 and a binary 8 into the accumulator 55a. In a similar manner, the successive ON states of the triggers 139–143 cause binary 1's stored in the triggers 162–166 respectively to insert into the accumulator 55b (through their respective associated AND gates 148–152 and the OR units 155, 158 and 160) a binary 7, a binary 5, a binary 1, a binary 2 and a binary 4. The accumulator 55b adds and accumulates all of the binary inputs supplied to it to develop the unit's digit of a decimal summation of the product of the binary 1's in the accumulator 55a by the weighed values shown by the numbers in association with each of the AND gates 144–152. In this respect, it will be noted that these weighed values become repetitive after the weighed value 5 so that a key data word having an even larger number of data characters than ten could be similarly handled merely by enlargement of the components of the system here shown except for the accumulator 55b and the compare unit 40 and the resultant generated and stored check characters would yet be converted to a single check digit. The derived check digit resulting from operation of the accumulator 55b is translated in binary form to storage in the check digit position CK of the storage register 10', such translation being effected through AND gates not shown but corresponding to the AND gates 59 and 60 of FIG. 1 and which are conditioned by a turn OFF potential supplied by the trigger 143 through a delay unit 168.

While the FIG. 6 system has been described as generating a derived check digit for storage in the register 10' in association with a key data word to enable detection of transposition errors in a subsequent reproduction or generation of such word, it will be evident that as in the case of the FIG. 1 system the FIG. 6 system may also be used with a coincidence unit as in FIG. 3 to detect transposition errors or as in FIG. 5 to detect and correct single transposition errors or detect and indicate multiple transposition errors.

A table illustrating the manner in which a transposition error changes the derived check digit value is set forth below as Table A. As previously noted, a transposition can at most affect only three successive check character positions generated from a key data word. There are eight possible Hi-Lo change patterns, and these are shown at the left of Table A as eight rows each including three binary digits. The weighed values assigned to the check character binary-code positions are set forth immediately below the successive code positions shown in the first row of the table.

TABLE A

| Binary Hi-Lo Pattern | Check Character Code Position No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| | Position Weighed Value | | | | | | | | | | | | |
| | 1 | 2 | 4 | 9 | 7 | 5 | 1 | 2 | 4 | 9 | 7 | 5 | 1 |
| 0 0 0 | | 0 | 0 | 0 | 0 | 0 | 0 | | | | | | |
| 0 0 1 | | 4 | 9 | 7 | 5 | 1 | 2 | | | | | | |
| 0 1 0 | | 2 | 4 | 9 | 7 | 5 | 1 | | | | | | |
| 0 1 1 | | 6 | 3 | 6 | 2 | 6 | 3 | | | | | | |
| 1 0 0 | | 1 | 2 | 4 | 9 | 7 | 5 | | | | | | |
| 1 0 1 | | 5 | 1 | 1 | 4 | 8 | 7 | | | | | | |
| 1 1 0 | | 3 | 6 | 3 | 6 | 2 | 6 | | | | | | |
| 1 1 1 | | 7 | 5 | 0 | 1 | 3 | 8 | | | | | | |

Thus it can be seen that the weighed value of check character code positions 1, 7 and 13 is unity. The values appearing in the body of the table are obtained as follows: for any of the columns shown, the individual entries are obtained by multiplying digit by digit the three binary digits to the left of the entry by the three weighed values appearing directly above and centered upon the column and by adding the resultant three products to obtain the decimal value of the units position of the sum. For example, consider a Hi-Lo pattern 110 involving check character code positions 5, 6 and 7. The product of the left hand binary digit of the pattern and the weighed value of 7 assigned to check character code position 5 is added to the product of the center binary digit of the pattern and the weighed value 5 assigned to check character code position 6 and to this sum is added the product of the right hand binary digit of the pattern and the weighed value 1 assigned to check character code position 7. The resultant product-sum is $1\times7+1\times5+0\times1$ which is equal to 12 and this is equal to 2 modulus ten. An inspection of the table shows that all columns except the third contain unique product sums, modulus ten, and therefore all eight Hi-Lo patterns involving those columns is distinguishable. In column three all product sums are distinguishable for Hi-Lo patterns except patterns 0 0 0 and 1 1 1, but a single transposition cannot change the pattern 0 0 0 to 1 1 1 or vice-versa.

The accumulator MOD 10 represented by block 55b in FIG. 6 and shown in detail in FIG. 7 may be of any known type. For example, one suitable accumulator MOD 10 may employ a serial-parallel-binary-decimal adder, as shown in FIG. 7E of United States Patent 2,957,626, with the tens carry connection deleted and with associated gating circuitry connected between the output circuits of the adder and one group of input circuits of the adder. An additional reference is the text Synthesis of Electronics Computing and Control Circuits, by the staff of the Computation Laboratory, Harvard University Press, 1951, Chapter XII, entitled "Adders and Accumulators."

The accumulator MOD 10 shown in FIG. 7 employs a binary-decimal adder (with the tens carry connection deleted) which accepts 1, 2, 4 and 8 bit binary inputs at respective terminals 11–1, 11–2, 11–4 and 11–8 and through a storage loop (namely, delay units 61, 62, 64 and 68 of FIG. 7E of United States Patent 2,957,626) and gates 191, 192, 194 and 198 impresses these inputs on adder input circuits 12–1, 12–2, 12–4 and 12–8. Thus the structure of FIG. 7, in the absence of a read-out reset pulse appearing on line 169, accumulates the Modulo 10 summation of the decimal inputs. For example, assume the decimal inputs to be 1, 2, 4, 9, 7 and 5 (sum of 28), then the accumulator would manifest the decimal value 8 upon read out.

Read out and reset of the accumulator MOD 10 is accomplished by a read out reset potential pulse appearing on line 169. This pulse via AND gates 181, 182, 184 and 188 causes the value stored in the accumulator to be manifest on lines 171, 172, 174 and 178. This pulse, simultaneously with read-out via inverter 170 and AND gates 191, 192, 194 and 198, interrupts the storage loop, thereby resetting the value stored in the accumulator to zero.

While specific forms of the invention have been described for purposes of illustration, it is contemplated that numerous changes may be made without departing from the spirit of the invention.

I claim:

1. A system for enabling detection of character transposition errors in a multi-character data word having binary-coded characters comprising means for making available in serial form by successive levels of code bits individual pairs of adjacent characters of a data word with the code bit levels of each pair presented concurrently and in preselected order of levels within said each character pair, comparison means for receiving in turn the code bits of each said successive available character pair and responsive to code-bit values in corresponding levels thereof for providing in relation to each pair a numerically relative and positionally related high-low magnitude indication applicable to the concurrently presented characters in said each pair, and means for utilizing said indications to enable detection of character transposition errors prevailing in a purported facsimile of said data word.

2. A system for enabling detection of character transposition errors in a data word having plural binary coded characters comprising means for making available in serial form by successive levels of code bits a succession of plural pairs of numerically-coded characters of a data word with the code-bit levels of each pair presented concurrently and in preselected order of levels within said each character pair, comparison means for receiving in turn the code bits representative of individual characters in each said successively available character pair and responsive to the binary code-bit values in corresponding levels of the codes identifying the characters of the pair for successively providing in relation to each of successive pairs successive numerically relative and positionally related magnitude indications applicable to the concurrently presented characters in each of said successive pairs, and means for successively storing and utilizing said successive indications to enable detection of character transposition errors prevailing in a purported facsimile of said data word.

3. A system for enabling detection of character transposition errors in a data word having plural binary-coded characters comprising shift register means having plural character storage positions comprised of code-bit-level bit storage positions for storing individual binary-coded characters of a data word and including means for rolling bit storage in two character storage positions and thereafter shifting character storage in all said character storage positions to make available in serial form by successive code-bit levels plural pairs of successively adjacent characters of a data word with corresponding code-bit levels of each pair presented concurrently, comparison means for receiving in turn the code bits of each said successively available character pair and responsive to the binary code-bit values in corresponding levels of the binary codes identifying the characters thereof to provide for each pair a numerically relative and positionally related high or low magnitude indication, and means for utilizing said indications in succession to enable detection of character transposition errors prevailing in a purported facsimile of said data word.

4. A system for enabling detection of character transposition errors in a data word having plural coded characters comprising shifting register means for individually storing each character of a data word with the code bits thereof stored in preselected order of code-bit levels, means for successively shifting character storage in said shifting register means to make available in serial form by successive code-bit levels successive pairs of characters with the code-bit levels of each pair presented concurrently and in said preselected order of levels within each said successive character pair, comparison means coupled to said register means for receiving in turn the code bits of each said successively available character pair and responsive to the binary code-bit values in corresponding levels thereof to provide for each pair a numerically relative and positionally related high-low magnitude indication, and means for utilizing said indications to enable detection of character transposition errors prevailing in a purported facsimile of said data word.

5. A system for enabling detection of character transposition errors in a multi-character data word comprising means for storing a data word having plural binary-coded characters, means for selecting from said storage means in serial form and by corresponding levels of code bits successive pairs of successively adjacent characters, comparison means for receiving in turn each said successively selected character pair and responsive to code-bit values in corresponding levels thereof to provide for each pair a numerically relative and positionally related high-low magnitude indication, and means for collecting and preserving said indications to provide a check character enabling detection of character transposition errors prevailing in a purported facsimile of said data word.

6. A system for enabling detection of character transposition errors in a multi-character data word having binary-coded characters comprising shift register means having character storage positions for individually storing each character of a data word with the code bits thereof stored in preselected order of code-bit levels, means for successively shifting said register means by one character storage position to make available in succession from a preselected pair of storage positions thereof pairs of successively adjacent characters of a data word, means for rolling said preselected pair of character storage positions of said register means concurrently to present corresponding levels of code bits of said character pair in said preselected order of levels within each said successive character pair, comparison means for receiving in turn the code bits of each said successively available character pair and responsive to code-bit values in corresponding code-bit levels thereof to provide for each character pair an indication identifying the larger valued character, and means for utilizing said indications to create a check character enabling detection of character transposition errors prevailing in a purported facsimile of said data word.

7. A system for enabling detection of character transposition errors in a multi-character data word comprising means for storing a data word having plural binary-coded characters, means for selecting from said storage means successive pairs of successively adjacent characters, means for receiving each said successively selected character pair and responsive to the numeric code values thereof to generate a coded check character having for each character pair a numerically relative and positionally related high-low magnitude indicative code bit, means for providing a check character indicative of a transposition-error-free form of said data word, comparison means for comparing said check characters to detect a character transportation error prevailing in said stored data word and responsive to each detected transposition error for effecting selection from said storage means by said selecting means of successive character pairs from data words each having individually differing pairs of transposed characters and for effecting generation by said generating means of a check character applicable to individual ones of said last-named data words, and storage means for receiving a data word found by said comparison means to be free of character transposition error.

8. A system for enabling detection of character transposition errors in a multi-character data word comprising means for storing a data word having plural binary-coded characters, means for selecting from said storage means successive pairs of successively adjacent characters of said data word in original form and in modified forms thereof of which each provides an individual transposed pair of characters, comparison means for receiving each said character pair successively selected and responsive to the numeric code values thereof to generate for each form of said data word a check character having for each character pair a numerically relative and positionally related high-low magnitude indicative portion, means providing a standard check character having high-low magnitude portions indicative of a transposition-error-free form of data word, and means for comparing said standard check character with each said generated check characters to ascertain which of said original and modified forms of said data word is free of character transposition error as indicated by said standard check character.

9. A system for enabling detection of character transposition errors in a multi-character data word comprising means for making available in succession plural pairs of successively adjacent characters of a data word with the numeric-value-identified characters of each pair presented concurrently, comparison means for receiving in turn each said successively available character pair and responsive to said numeric-value character identifications thereof for generating a check character having for each character pair a numerically relative and positionally related high-low magnitude indicative check portion, and means including means assigning individual differing numerical values to said indicative-check-portions of said check character for converting said check character to a numeric check digit enabling detection of character transposition errors prevailing in a purported facsimile of said data word.

10. A system for enabling detection of character transposition errors in a multi-character data word comprising means for making available in succession plural pairs of characters of a data word with the numeric-value-identified characters of each pair presented concurrently and in preselected order of character-pair position within said word, means for receiving in turn each said successively available character pair and responsive to said numeric-value character identifications thereof for deriving in relation to each pair a numerically relative and positionally related magnitude indication, means for providing a pattern of magnitude indications defining said data word free of transposition errors, and means for compring said derived indications with said indication pattern to detect a character transposition error prevailing in said data word.

References Cited

UNITED STATES PATENTS

| | | | |
|---|---|---|---|
| 2,973,508 | 2/1961 | Chadurjian | 340—174 |
| 3,040,296 | 6/1962 | Poole et al. | 340—147 |
| 3,102,254 | 8/1963 | Levy | 340—146.1 |
| 3,188,609 | 6/1965 | Harmon et al. | 340—146.1 |
| 3,221,310 | 11/1965 | Reach | 340—174 |

MALCOLM A. MORRISON, *Primary Examiner.*

K. MILDE, *Assistant Examiner.*